United States Patent
Tamura

(10) Patent No.: US 12,156,113 B2
(45) Date of Patent: Nov. 26, 2024

(54) GATEWAY DEVICE, CORE NETWORK DEVICE, COMMUNICATION SYSTEM, DELIVERY METHOD, AND NON-TRANSITORY COMPUTER-READABLE MEDIUM

(71) Applicant: NEC Corporation, Tokyo (JP)

(72) Inventor: Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 319 days.

(21) Appl. No.: 17/629,838

(22) PCT Filed: Feb. 19, 2021

(86) PCT No.: PCT/JP2021/006511
§ 371 (c)(1),
(2) Date: Jan. 25, 2022

(87) PCT Pub. No.: WO2021/192769
PCT Pub. Date: Sep. 30, 2021

(65) Prior Publication Data
US 2022/0264277 A1    Aug. 18, 2022

(30) Foreign Application Priority Data
Mar. 24, 2020 (JP) .................. 2020-052919

(51) Int. Cl.
*H04W 4/90* (2018.01)
*H04W 4/12* (2009.01)
(Continued)

(52) U.S. Cl.
CPC .............. *H04W 4/90* (2018.02); *H04W 4/12* (2013.01); *H04W 76/50* (2018.02); *H04W 88/16* (2013.01)

(58) Field of Classification Search
CPC ......... H04W 76/50; H04W 4/90; H04W 8/26; H04W 40/20; H04W 88/16
(Continued)

(56) References Cited

U.S. PATENT DOCUMENTS

| 11,653,411 | B2 * | 5/2023 | Ganig ................... H04W 48/18 |
| | | | 455/404.1 |
| 2018/0054722 | A1 | 2/2018 | Tamura |

(Continued)

FOREIGN PATENT DOCUMENTS

| WO | 2016/147600 A | 9/2016 |
| WO | 2016/157890 A1 | 10/2016 |

OTHER PUBLICATIONS

Extended European Search Report for EP Application No. 21775968.7, dated on Oct. 11, 2022.
(Continued)

*Primary Examiner* — Maria El-Zoobi
(74) *Attorney, Agent, or Firm* — Sughrue Mion, PLLC

(57) ABSTRACT

The gateway device (10) according to the present disclosure includes a communication unit (11) that receives SNPN identification information to be used for identifying a SNPN from a SNPN core network device deployed in the SNPN and transmits emergency information to the SNPN core network device after receiving a distribution message for requesting for distributing the emergency information via a network operated by a communication carrier, and a distribution control unit (12) that selects, when receiving the distribution message, at least one piece of SNPN identification information from among a plurality of pieces of SNPN identification information received from a plurality of the SNPN core network devices. The communication unit (11) transmits the emergency information to the SNPN core
(Continued)

network device deployed in the SNPN identified by the selected SNPN identification information.

6 Claims, 17 Drawing Sheets

(51) Int. Cl.
  *H04W 76/50* (2018.01)
  *H04W 88/16* (2009.01)
(58) Field of Classification Search
  USPC ...................................................... 455/404.1
  See application file for complete search history.

(56) References Cited

U.S. PATENT DOCUMENTS

2018/0091955 A1    3/2018  Inagaki
2020/0245235 A1*   7/2020  Chun .................... H04W 48/18

OTHER PUBLICATIONS

OPPO, "Key Issue: Support for IMS and emergency services for SNPN", 3GPP DRAFT, S2-1909242, Oct. 14-18, 2019, pp. 1-3.

TS 23.041 V16.3.0,"3rd Generation Partnership Project; Technical Specification Group Core Network and Terminals; Technical realization of Cell Broadcast Service (CBS) (Release16)",3GPP DRAFT, Mar. 19, 2020, pp. 1-100.

TS 23.501 V16.4.0,"3rd Generation Partnership Project; Technical Specification Group Services and System Aspects; System architecture for the 5G System (5GS); Stage 2 (Release16)",3GPP DRAFT, Mar. 23, 2020, pp. 1-430.

International Search Report for PCT Application No. PCT/JP2021/006511, mailed on May 25, 2021.

3GPP TS25.304 V15.0.0 (Jun. 2018), pp. 1-58.

3GPP TS23.501 V16.3.0 (Dec. 2019), pp. 1-417.

3GPP TS22.268 V16.3.0 (Jun. 2019), pp. 1-21.

R2-1915788, Qualcomm Incorporated (rapporteur), Report for email discussion [107bis#64][PRN] Suitable and acceptable NPN cells (Qualcomm), 3GPP TSG RAN WG2 #108, Nov. 7, 2019, pp. 1-25.

* cited by examiner

Fig. 5

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Global RAN Node ID | M | | 9.3.1.5 | | YES | reject |
| RAN Node Name | O | | PrintableString (SIZE(1..150, ...)) | | YES | ignore |
| Supported TA List | | 1 | | Supported TAs in the NG-RAN node. | YES | reject |
| >Supported TA Item | | 1..<maxnoofTACs> | | | - | |
| >>TAC | M | | 9.3.3.10 | Broadcast TAC | - | |
| >>Broadcast PLMN List | | 1..<maxnoofBPLMNs> | | | - | |
| >>>Broadcast PLMN Item | | | | | - | |
| >>>>PLMN Identity | M | | 9.3.3.5 | Broadcast PLMN | - | |
| >>>>TAI Slice Support List | M | | Slice Support List 9.3.1.17 | Supported S-NSSAIs per TA. | - | |
| Default Paging DRX | M | | Paging DRX 9.3.1.90 | | YES | ignore |
| UE Retention Information | O | | 9.3.1.117 | | YES | ignore |

| IE/Group Name | Presence | Range | IE type and reference | Semantics description |
|---|---|---|---|---|
| CHOICE NG-RAN node | M | | | |
| >gNB | | | | |
| >>Global gNB ID | M | | 9.3.1.6 | |
| >ng-eNB | | | | |
| >>Global ng-eNB ID | M | | 9.3.1.8 | |
| >N3IWF | | | | |
| >>Global N3IWF ID | M | | 9.3.1.57 | |
| >SNPN | | | | |
| >>SNPN ID | | | | |

Fig. 6

| IE/Group Name | Presence | Range | IE type and reference | Semantics description |
|---|---|---|---|---|
| PLMN Identity | M | | 9.3.3.5 | |
| List of NID | M | | | |
| >NID | | | | |
| >>NID | M | | BIT STRING (SIZE(22..32)) | |

Fig. 7

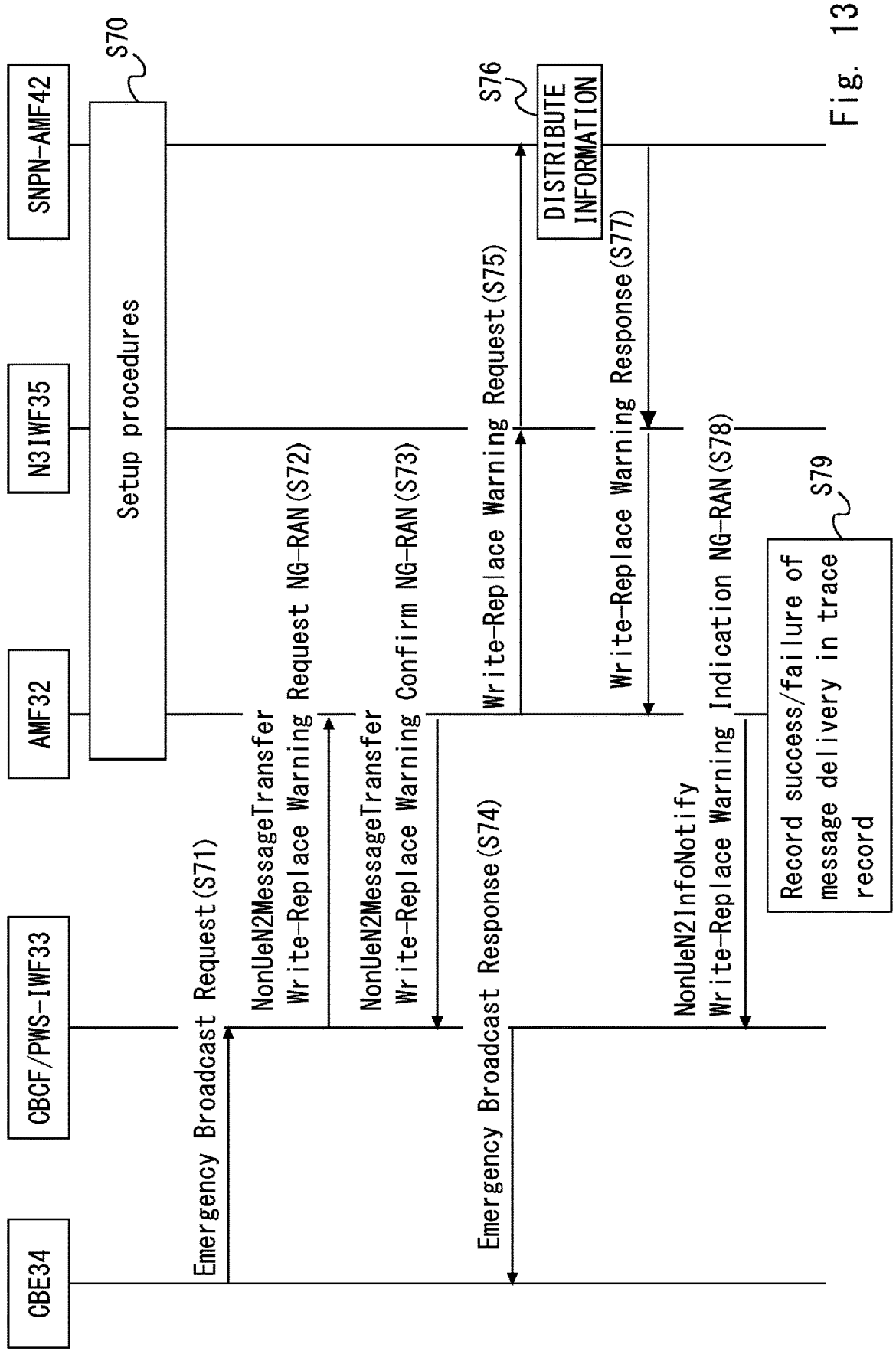

Fig. 14

| PARAMETER | REFERENCE | PRESENCE |
|---|---|---|
| Message Type | 9.3.28 | M |
| Message Identifier | 9.3.1 | M |
| Serial-Number | 9.3.3 | M |
| Repetition-Period E-UTRAN | 9.3.36 | M |
| No-of-Broadcasts-Requested | 9.3.9 | M |
| List of TAIs | 9.3.29 | O |
| Warning Area List | 9.3.30 | O |
| Extended Repetition-Period | 9.3.37 | O |
| Warning-Type | 9.3.24 | O |
| Warning-Security-Information | 9.3.25 | O |
| Data Coding Scheme | 9.3.18 | O (NOTE) |
| Warning Message Content E-UTRAN | 9.3.35 | O |
| OMC ID | 9.3.31 | O |
| Concurrent Warning Message Indicator | 9.3.32 | O |
| Send Write-Replace-Warning-Indication | 9.3.39 | O |
| Global eNB ID | 9.3.46 | O |
| List of NG-RAN TAIs | 9.3.54 | O |
| Warning Area List NG-RAN | 9.3.55 | O |
| Warning Message Content NG-RAN | 9.3.51 | O |
| Global RAN Node ID | 9.3.53 | O |
| RAT Selector NG-RAN | 9.3.56 | O |
| Warning Area Coordinates | 9.3.63 | O |

NOTE: The Data Coding Scheme IE is not required for ETWS primary notification but it is mandatory for ETWS secondary notification and CMAS warning messages when Warning Message Content E-UTRAN IE is present.

| IE/Group Name | Presence | Range | IE type and reference | Semantics description |
|---|---|---|---|---|
| PLMN Identity | M | | 9.3.3.5 | |
| List of NID | M | | | |
| >NID | | | | |
| >>NID | M | | BIT STRING (SIZE(22..32)) | |
| >>Location | | | | |

Fig. 15

| IE/Group Name | Presence | Range | IE type and reference | Semantics description |
|---|---|---|---|---|
| PLMN Identity | M | | 9.3.3.5 | |
| List of NID | M | | | |
| >NID | | | | |
| >>NID | M | | BIT STRING (SIZE(22..32)) | |
| >>TAI | | | | |

Fig. 16

GATEWAY DEVICE, CORE NETWORK DEVICE, COMMUNICATION SYSTEM, DELIVERY METHOD, AND NON-TRANSITORY COMPUTER-READABLE MEDIUM

This application is a National Stage Entry of PCT/JP2021/006511 filed on Feb. 19, 2021, which claims priority from Japanese Patent Application 2020-052919 filed on Mar. 24, 2020, the contents of all of which are incorporated herein by reference, in their entirety.

TECHNICAL FIELD

The present disclosure relates to a gateway device, a core network device, a communication system, a distribution method, and a program.

BACKGROUND ART

In 3rd generation partnership project (3GPP), as a radio system for achieving higher-speed communication than long term evolution (LTE), a standard specification of a radio system called 5G has been established. A communication system that achieves 5G (hereinafter, referred to as a 5G communication system) has a base station supporting 5G (hereinafter, referred to as a 5G base station) as a radio system, and a core network accommodating the base station supporting 5G (hereinafter, referred to as a 5G core network). In the 5G communication system, there are a form in which a communication carrier operates the 5G communication system in order to provide a service for a wide range of general users, and a form in which a provider or an enterprise being different from the communication carrier directly operates the 5G communication system without intervention of the communication carrier. In the 3GPP, stand-alone non-public networks (SNPN) are defined as a 5G communication system directly operated by an enterprise. Apart from a 5G base station and a 5G core network being operated by a communication carrier, the SNPN have a 5G base station and a 5G core network being operated directly by an enterprise. Location information of a communication terminal using the SNPN, subscriber information, and the like are registered in the 5G core network directly operated by the enterprise. Meanwhile, Non Patent Literature 2 discloses a technique for performing interworking with a 5G communication system provided by a communication carrier even in a case of the SNPN.

Herein, in the 3GPP, a specification of a public warning system (PWS) for distributing information in an emergency such as a disaster is defined. The PWS is used as an earthquake and tsunami warning system (ETWS) for distributing emergency information in Japan. Non Patent Literature 1 defines that emergency information to be distributed in the ETWS is also distributed to a communication terminal for which location information, subscriber information, and the like are not managed in a 5G communication system operated by a communication carrier. Therefore, even in a communication terminal in which location information, subscriber information, and the like are registered only in a 5G core network directly operated by an enterprise, it is necessary to be able to receive information distributed from the ETWS.

CITATION LIST

Non Patent Literature

[Non Patent Literature 1] 3GPP TS25.304 V15.0.0 (2018-06)
[Non Patent Literature 2] 3GPP TS23.501 V16.3.0 (2019-12)
[Non Patent Literature 3] 3GPP TS22.268 V16.3.0 (2019-06)

SUMMARY OF INVENTION

Technical Problem

However, Non Patent Literature 1 does not explicitly describe a cooperation procedure between the 5G communication system operated by the communication carrier and the SNPN. Therefore, a procedure of distributing emergency information distributed via the 5G communication system operated by the communication carrier to the SNPN is not clear. As a result, there is a problem that a communication terminal using the SNPN cannot receive the emergency information.

An object of the present disclosure is to provide a gateway device, a core network device, a communication system, a distribution method, and a program that are capable of distributing emergency information to a communication terminal using SNPN.

Solution to Problem

A gateway device according to a first aspect of the present disclosure includes: a communication unit that receives a stand-alone non-public network (SNPN) identification information to be used for identifying a SNPN from a SNPN core network device deployed in the SNPN, and transmits emergency information to the SNPN core network device after receiving a distribution message for requesting for distributing the emergency information via a network operated by a communication carrier; and a distribution control unit that selects, when receiving the distribution message, at least one piece of SNPN identification information from among a plurality of pieces of the SNPN identification information received from a plurality of the SNPN core network devices, wherein the communication unit transmits the emergency information to the SNPN core network device deployed in the SNPN identified by the selected SNPN identification information.

A core network device according to a second aspect of the present disclosure includes: a communication unit that receives stand-alone non-public network (SNPN) identification information to be used for identifying a SNPN from a SNPN core network device deployed in the SNPN via a gateway device deployed in a network operated by a communication carrier, and transmits a distribution message, which requests for distributing emergency information from an information transmission source via a network operated by a communication carrier, to the gateway device after receiving the distribution message including the SNPN identification information; and a distribution control unit that selects, when receiving the distribution message, the gateway device being a transmission source of the SNPN identification information included in the distribution message, wherein the communication unit transmits the distribution message to the selected gateway device.

A communication system according to a third aspect of the present disclosure includes: a gateway device configured to receive stand-alone non-public network (SNPN) identification information to be used for identifying a SNPN from a SNPN core network device deployed in the SNPN and further transmit the SNPN identification information to a core network device, and configured to select at least one piece of SNPN identification information from among a plurality of pieces of the SNPN identification information received from a plurality of the SNPN core network devices, when receiving a distribution message for requesting for distributing emergency information via a network operated by a communication carrier, and further transmit the emergency information to the SNPN core network device deployed in the SNPN identified by the selected SNPN identification information; and a core network device configured to receive, via the gateway device, SNPN identification information to be used for identifying the SNPN, and configured to select the gateway device being a transmission source of the SNPN identification information included in a distribution message, when receiving the distribution message for requesting for distributing emergency information from an information transmission source via a network operated by a communication carrier, and further transmit the distribution message to the selected gateway device.

A distribution method according to a third aspect of the present disclosure includes: receiving SNPN identification information to be used for identifying a SNPN from a SNPN core network device deployed in the SNPN; selecting, when receiving a distribution message for requesting for distributing emergency information, at least one piece of SNPN identification information from among a plurality of pieces of the SNPN identification information received from a plurality of the SNPN core network devices; and transmitting the emergency information to the SNPN core network device deployed in the SNPN identified by the selected SNPN identification information.

A program according to a fourth aspect of the present disclosure causes a computer to execute: receiving SNPN identification information to be used for identifying a SNPN from a SNPN core network device deployed in the SNPN; selecting, when receiving a distribution message for requesting for distributing emergency information, at least one piece of SNPN identification information from among a plurality of pieces of the SNPN identification information received from a plurality of the SNPN core network devices; and transmitting the emergency information to the SNPN core network device deployed in the SNPN identified by the selected SNPN identification information.

Advantageous Effects of Invention

According to the present disclosure, a gateway device, a core network device, a communication system, a distribution method, and a program are able to be provided.

BRIEF DESCRIPTION OF THE DRAWINGS

FIG. 5 is a diagram illustrating parameters constituting an NG SETUP REQUEST message according to the second example embodiment.

FIG. 6 is a diagram illustrating parameters constituting a global RAN node ID according to the second example embodiment.

FIG. 7 is a diagram illustrating parameters constituting a SNPN ID according to the second example embodiment.

FIG. 13 is a diagram illustrating a flow of a distribution process of emergency information according to the second example embodiment.

FIG. 14 is a diagram illustrating a list of parameters being set in a Write-Replace Warning Request NG-RAN message according to the second example embodiment.

FIG. 15 is a diagram illustrating parameters constituting the SNPN ID according to a third example embodiment.

FIG. 16 is a diagram illustrating parameters constituting the SNPN ID according to the third example embodiment.

DESCRIPTION OF EMBODIMENTS

First Example Embodiment

Figure 1:
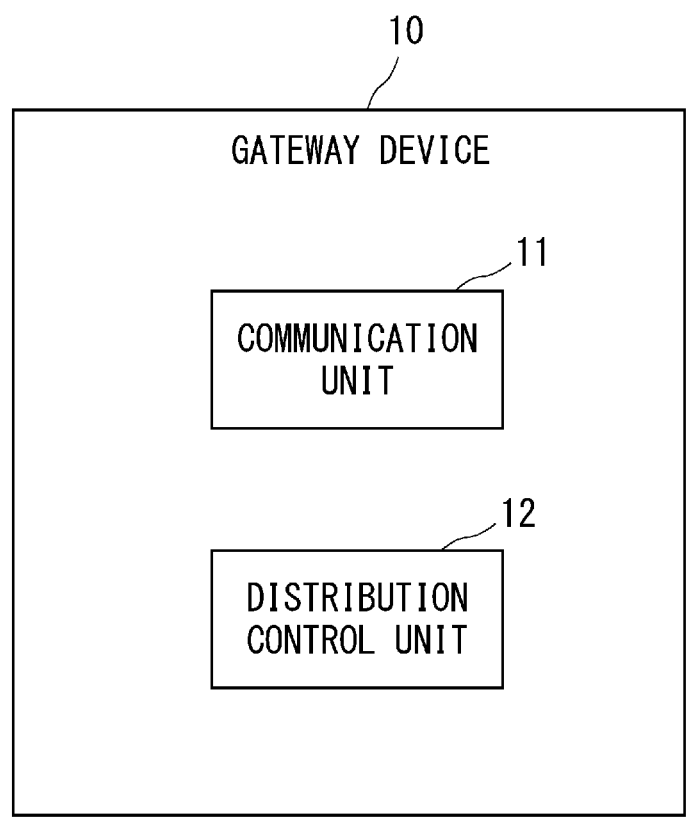
FIG. 1 is a configuration diagram of a gateway device according to a first example embodiment.

Example embodiments of the present disclosure will be described below with reference to the drawings. A configuration example of a gateway device 10 according to a first example embodiment will be described by using FIG. 1. The gateway device 10 may be a computer device that operates by causing a processor to execute a program stored in a memory.

The gateway device 10 includes a communication unit 11 and a distribution control unit 12. The communication unit 11 and the distribution control unit 12 may be software or a module in which processing is executed by causing a processor to execute a program stored in a memory. Alternatively, the communication unit 11 and the distribution control unit 12 may be hardware such as a circuit or a chip.

The communication unit 11 receives stand-alone non-public network (SNPN) identification information used for identifying a SNPN from a SNPN core network device deployed in the SNPN. For example, in a setup process, the communication unit 11 receives the SNPN identification information. The setup process may be, for example, a process being executed when the gateway device 10 or the SNPN core network device is newly installed. The setup process may be a preparation process before a communication terminal or the like performs communication via the gateway device 10. The setup process may be a process executed when a parameter to be shared in the gateway device 10 or the SNPN core network device is changed in any one of the devices.

The SNPN is a network being directly operated by a provider or an enterprise different from a communication carrier without intervention of the communication carrier. The SNPN has a SNPN core network device and a SNPN access network device. The SNPN core network device is a device for managing location information and the like of a communication terminal using the SNPN. The SNPN access network device is a device for performing wireless communication with a communication terminal using the SNPN, and may be, for example, a base station.

The communication unit 11 may receive the SNPN identification information directly from the SNPN core network device, or may receive the SNPN identification information from the SNPN core network device via one or more relay devices. The relay device may be another SNPN core network device or a router device.

The SNPN is a different network for each operating provider. Therefore, when there are a plurality of providers operating the SNPN, there are a plurality of SNPNs having different SNPN identification information. Therefore, the communication unit 11 may receive a plurality of pieces of SNPN identification information from a plurality of SNPN core network devices.

Further, the communication unit 11 may receive closed access group (CAG) identification information for identifying a CAG instead of the SNPN identification information or together with the SNPN identification information. The CAG identification information is information indicating an access network or a cell to which a communication terminal can access. The communication terminal has the CAG identification information and does not access any cell other than the cell to which access is permitted.

The communication unit 11 transmits emergency information to the SNPN core network device after receiving a distribution message for requesting for distributing the emergency information via a network operated by a communication carrier. For example, in an information distribution process, the communication unit 11 transmits the emergency information to the SNPN core network device.

The information distribution process is a process of distributing emergency information including the above-described ETWS or the like to the communication terminal, when an earthquake, a tsunami, or the like occurs after the setup process is completed. A network operated by a communication carrier may be referred to as a mobile network operator (MNO) network, a public land mobile network (PLMN), or the like. The emergency information includes a commercial mobile alert system (CMAS), an earthquake and tsunami warning system (ETWS), a Korean public alert system (KPAS), and EU-ALERT, which are defined in Non Patent Literature 3.

The communication unit 11 may receive the distribution message via, for example, a core network device or the like deployed in a network operated by a communication carrier.

When receiving a distribution message by the communication unit 11, the distribution control unit 12 selects at least one piece of SNPN identification information from among a plurality of pieces of the SNPN identification information received from a plurality of the SNPN core network devices. In other words, the distribution control unit 12 selects at least one SNPN core network device being a transmission destination of emergency information, from among a plurality of SNPN core network devices.

The communication unit 11 transmits emergency information to the SNPN core network device deployed in the SNPN identified by the SNPN identification information selected in the distribution control unit 12. The communication unit 11 may transmit a distribution message including the emergency information to the SNPN core network device.

As described above, the gateway device 10 according to the first example embodiment receives the SNPN identification information from the SNPN core network device. Thus, when the gateway device 10 receives a distribution message for requesting for distributing emergency information via a network operated by a communication carrier, the gateway device 10 selects SNPN identification information, and thereby transmits the emergency information to the SNPN core network device. As a result, a communication terminal using the SNPN can receive the emergency information via the SNPN core network device.

Figure 2:
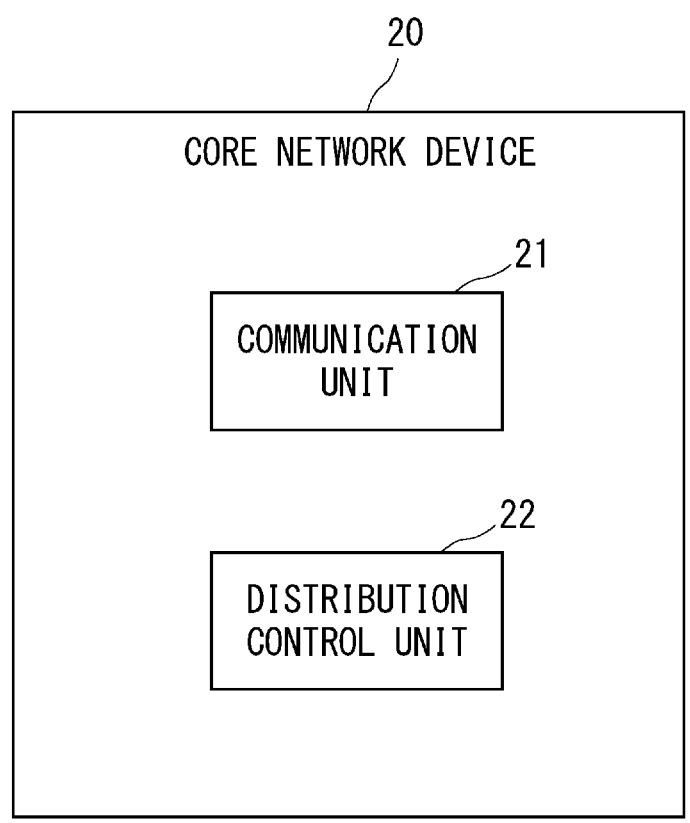
FIG. 2 is a configuration diagram of a core network device 20 according to the first example embodiment.

Further, the same process as that of the gateway device 10 may be executed in a core network device 20 deployed in a network operated by a communication carrier. The core network device 20 relays communication between the gateway device 10 and a server device or the like that distributes emergency information. A configuration example of the core network device 20 will be described by using FIG. 2.

The core network device 20 may be a computer device that operates by causing a processor to execute a program stored in a memory.

The core network device 20 includes a communication unit 21 and a distribution control unit 22. The communication unit 21 and the distribution control unit 22 may be software or a module in which processing is executed by causing a processor to execute a program stored in a memory. Alternatively, the communication unit 21 and the distribution control unit 22 may be hardware such as a circuit or a chip.

In a setup process, the communication unit 21 receives SNPN identification information used for identifying the SNPN from the SNPN core network device deployed in the SNPN via the gateway device 10 deployed in a network operated by a communication carrier. In addition, in an information distribution process, the communication unit 21 transmits emergency information to the gateway device 10 after receiving a distribution message for requesting for distributing the emergency information from an information transmission source via the network operated by the communication carrier.

When receiving the distribution message, the distribution control unit 22 selects at least one piece of SNPN identification information from among the plurality of pieces of SNPN identification information received from the gateway device 10. The communication unit 11 transmits the emergency information to the gateway device 10 that has transmitted the SNPN identification information selected by the communication unit 21.

Second Example Embodiment

Figure 3:
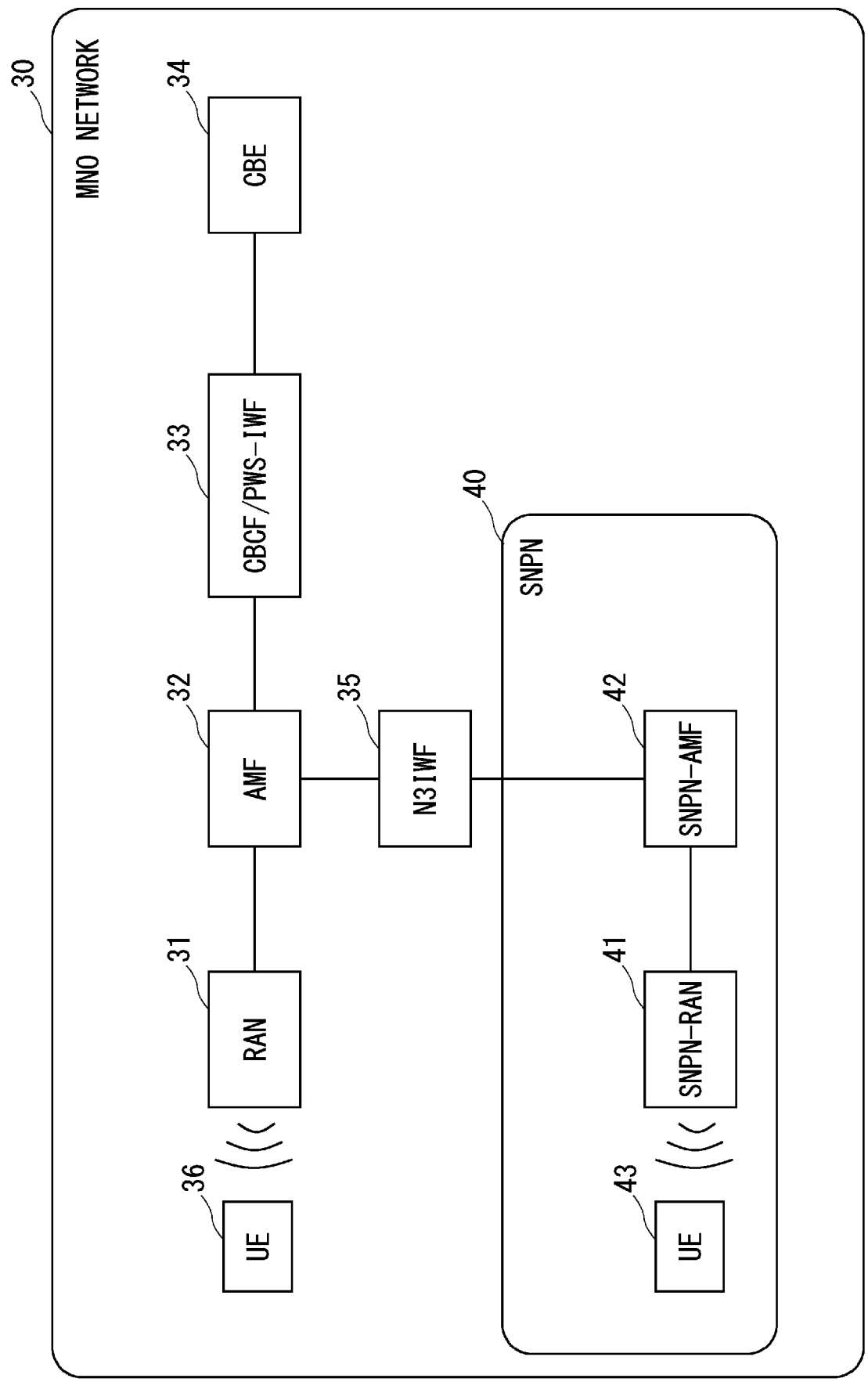
FIG. 3 is a configuration diagram of a communication system according to a second example embodiment.

Next, a configuration example of a communication system according to a second example embodiment will be described by using FIG. 3. The communication system in FIG. 3 illustrates a configuration in which an MNO network 30 includes a SNPN 40. That is, the SNPN 40 overlaps with some areas of the MNO network 30. In other words, the MNO network 30 includes the SNPN 40. Alternatively, some areas of the SNPN 40, rather than the entire areas of the SNPN 40, may overlap with some areas of the MNO network 30. Alternatively, the SNPN 40 may exist in an area not included in the MNO network 30.

The MNO network 30 includes a radio access network (RAN) entity (hereinafter, referred to as RAN) 31, an access and mobility function (AMF) entity (hereinafter, referred to as AMF) 32, a cell broadcast centre function (CBCF)/public warning system-interworking function (PWS-IWF) entity (hereinafter, referred to as CBCF/PWS-IWF) 33, a cell broadcast entity (CBE) 34, and a non-3GPP interworking function (N3IWF) entity (hereinafter, referred to as N3IWF) 35. A user equipment (UE) 36 is a communication terminal held by a user who uses the MNO network 30.

The N3IWF 35 is equivalent to the gateway device 10 in FIG. 1. Further, the AMF 32 is equivalent to the core network device 20 in FIG. 2.

The RAN 31 is, for example, a base station supporting 5G as a radio system, and may be, for example, a gNB. The AMF 32 manages access and mobility related to the UE 36 held by a user using the MNO network 30. Specifically, the AMF 32 manages location information of the UE 36, and executes an authentication process of the UE 36 in cooperation with an authentication device (not illustrated).

The CBE 34 may be, for example, a server device and the like managed by an administrative agency that monitors an earthquake, a tsunami, or the like. The CBE 34 generates emergency information and transmits the generated emergency information to the CBCF/PWS-IWF 33. The CBCF/PWS-IWF 33 is a device in which a CBCF entity and a PWS-IWF entity are integrated together. When receiving the emergency information from the CBE 34, the CBCF/PWS-IWF 33 specifies a distribution area of the emergency information. For example, the CBCF/PWS-IWF 33 specifies a cell, a tracking area (TA), or an emergency area (EA) as a distribution area. The EA is a distribution area that can be uniquely set by a communication carrier regardless of the TA. In addition, the CBCF/PWS-IWF 33 may specify SNPN identification information or identification information of the N3IWF 35 being capable of performing communication with a device deployed in the SNPN 40 in order to distribute the emergency information to a UE 43 using the SNPN 40.

The N3IWF 35 communicates with the UE 43 via the SNPN 40. The N3IWF 35 connects between different networks each other, and relays control data that is related to the UE 43 and is transmitted between the UE 43 and the AMF 32. The control data may be referred to as control (C)-Plane data. The emergency information may be transmitted as C-Plane data.

Data transmitted between the N3IWF 35 and the UE 43 is encrypted using an IPsec. That is, the N3IWF 35 and the UE 43 establish an IPsec security association (SA). However, broadcast information such as emergency information may be encrypted by using the IPsec and transmitted to the UE 43, or may be transmitted to the UE 43 without being encrypted.

The SNPN 40 has a SNPN-RAN 41 and a SNPN-AMF 42. The SNPN-RAN 41 may be a base station deployed in the SNPN. For example, the SNPN-RAN 41 may be a gNB supporting 5G as a radio system. The SNPN-AMF 42 is equivalent to a SNPN core network device. The SNPN-AMF 42 manages access and mobility related to the UE 43 held by a user using the SNPN 40. Specifically, the SNPN-AMF 42 manages location information of the UE 43, and executes the authentication process of the UE 43 in cooperation with an authentication device (not illustrated).

The SNPN-AMF 42 transmits SNPN identification information for identifying the SNPN 40 to the N3IWF 35. Further, when receiving emergency information from the N3IWF 35, the SNPN-AMF 42 transmits the emergency information to the UE 43 via the SNPN-RAN 41.

Figure 4:
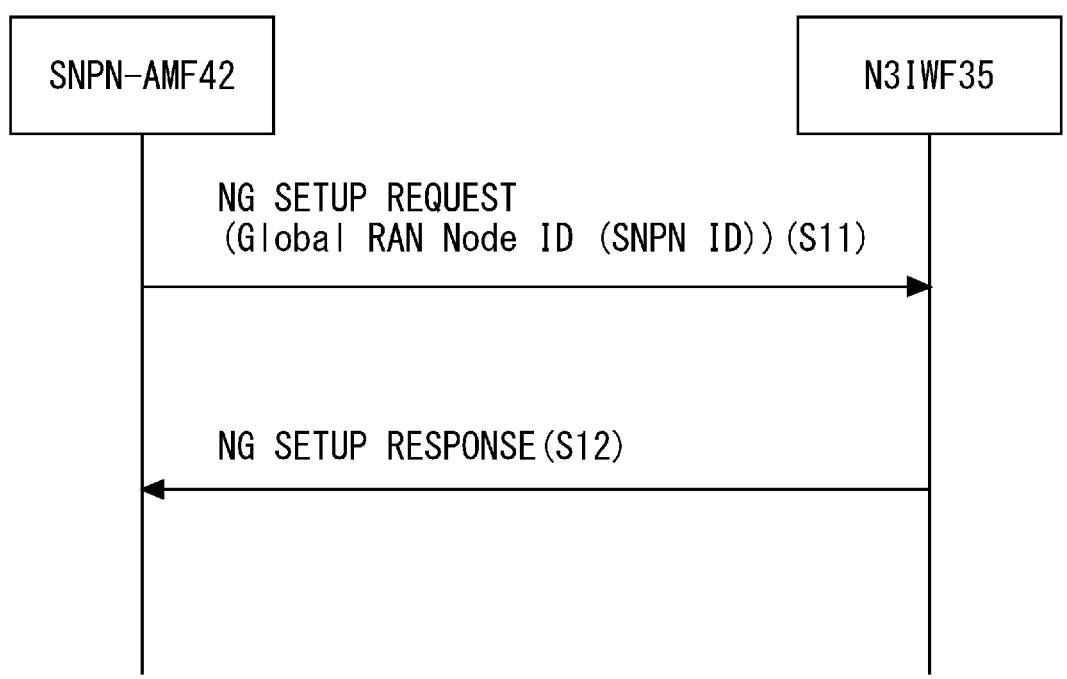
FIG. 4 is a diagram illustrating a flow of a process in which a SNPN-AMF transmits SNPN identification information to a N3IW 5 according to the second example embodiment.

Next, a flow of a process in which the SNPN-AMF 42 transmits the SNPN identification information to the N3IWF 35 will be described by using FIG. 4. FIG. 4 illustrates a process executed when a Y2 interface between the SNPN-AMF 42 and the N3IWF 35 is newly set up. The Y2 interface may be referred to as a Y2 reference point. A case where the Y2 interface is newly set up may be, for example, a case where the SNPN 40 including the SNPN-AMF 42 or the N3IWF 35 is newly constructed or installed. Specifically, FIG. 4 illustrates a setup process for causing the SNPN-AMF 42 to register a parameter with N3IWF 35 as the Y2 interface between the SNPN-AMF 42 and the N3IWF 35 is set up.

The Y2 interface is defined between the SNPN-AMF 42 and the N3IWF 35 in the 3GPP. The Y2 interface defines an operation similar to an N2 interface or an N2 reference point defined between the RAN 31 and the AMF 32. In addition, the N2 interface is also defined between the N3IWF 35 and the AMF 32. Therefore, when the Y2 interface is set up, a process of a procedure similar to an NG Setup process executed when the N2 interface is set up is executed between the SNPN-AMF 42 and the N3IWF 35. The NG Setup process is a process defined in the 3GPP.

First, the SNPN-AMF 42 transmits an NG SETUP REQUEST message to the N3IWF 35 (S11). The NG SETUP REQUEST message includes a global RAN node ID as a parameter, as illustrated in FIG. 5. In addition, parameters illustrated in FIG. 6 are set in the global RAN node ID. The global RAN node ID includes a SNPN ID, as illustrated in FIG. 6. In the step S11, the SNPN-AMF 42 transmits, to the N3IWF 35, the NG SETUP REQUEST message in which the SNPN ID is set in the global RAN node ID. In a case where the SNPN-AMF 42 accommodates a plurality of SNPNs, the SNPN-AMF 42 may set a plurality of SNPN IDs in the global RAN node ID.

FIG. 7 illustrates parameters that constitute the SNPN ID. FIG. 7 illustrates that a list of network identifiers (NIDs) can be set in the SNPN ID. The list of NIDs indicates that a plurality of NIDs are included. The NID is used for identifying each network included in the SNPN, for example, when the SNPN includes a plurality of networks. Including a plurality of networks by the SNPN may mean, for example, that a provider operating the SNPN constructs a plurality of networks in a physically distant place, or may mean that a different network is constructed for each department. In such a case, the provider identifies each network using the NID. That is, the provider assigns a different NID to each network.

Returning to FIG. 4, when receiving the NG SETUP REQUEST message in which the SNPN ID is set, the N3IWF 35 transmits an NG SETUP RESPONSE message to the SNPN-AMF 42 as a response message (S12). When acquiring the SNPN-ID from the SNPN-AMF 42, the N3IWF 35 manages the acquired SNPN-ID and identification information of the SNPN-AMF 42 in association with each other.

Figure 8:
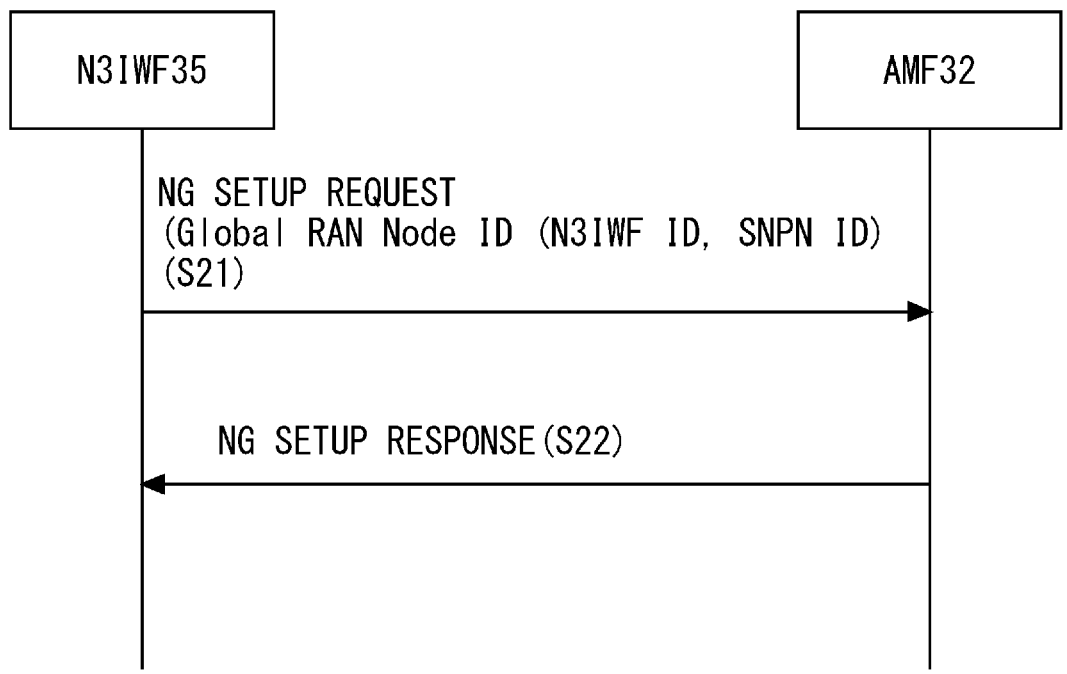
FIG. 8 is a diagram illustrating a flow of a process in which an N3IWF transmits SNPN identification information to an AMF according to the second example embodiment.

Next, a flow of a process in which the N3IWF 35 transmits the SNPN identification information to the AMF 32 will be described by using FIG. 8. FIG. 8 illustrates a process executed when the N2 interface between the N3IWF 35 and the AMF 32 is newly set up. A case where the N2 interface is newly set up may be, for example, a case where the SNPN 40 including the SNPN-AMF 42 is newly constructed. FIG. 8 illustrates a process for causing the N3IWF 35 to register a parameter with the AMF 32 as the N2 interface between the N3IWF 35 and the AMF 32 is set up.

First, the N3IWF 35 transmits the NG SETUP REQUEST message to the AMF 32 (S21). The NG SETUP REQUEST message includes the parameters illustrated in FIG. 5. The N3IWF 35 may set the SNPN ID together with an N3IWF ID (global N3IWF ID) in the global RAN node ID in order to transmit the SNPN-ID acquired from the SNPN-AMF 42 to the AMF 32. The N3IWF ID is identification information for identifying the N3IWF 35. Alternatively, the N3IWF 35 may add the SNPN ID acquired from the SNPN-AMF 42 to the IE/Group Name of the parameter list illustrated in FIG. 5.

In addition to the SNPN-AMF 42, the N3IWF 35 may acquire SNPN-IDs from a plurality of SNPN-AMFs. In such a case, the N3IWF 35 may set a list of SNPN IDs including a plurality of SNPN-IDs in the NG SETUP REQUEST message. The N3IWF 35 may acquire a plurality of SNPN-IDs from the SNPN-AMF 42. Also in such a case, the N3IWF 35 may set a list of SNPN IDs including a plurality of SNPN-IDs in the NG SETUP REQUEST message.

Next, when receiving the NG SETUP REQUEST message in which the N3IWF ID and the SNPN ID are set, the AMF 32 transmits the NG SETUP RESPONSE message to the N3IWF 35 as a response message (S22). When acquiring the N3IWF ID and the SNPN-ID from the N3IWF 35, the AMF 32 manages the N3IWF ID and the SNPN-ID included in the NG SETUP REQUEST message in association with each other.

Figure 9:
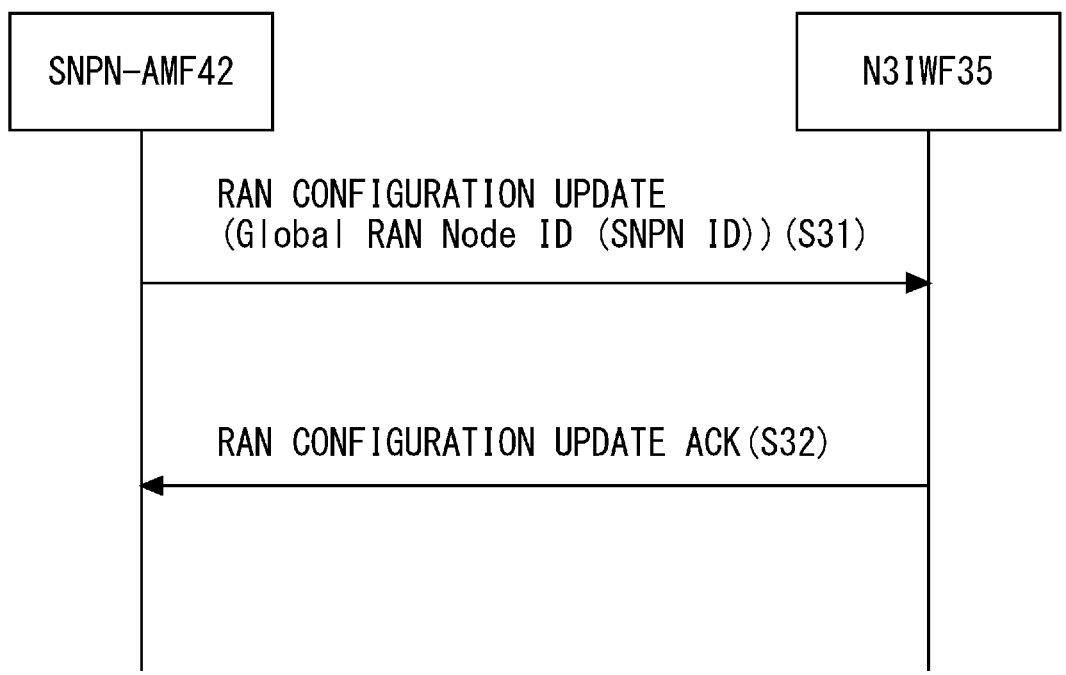
FIG. 9 is a diagram illustrating a flow of a process in which the SNPN-AMF transmits SNPN identification information to the N3IW 5 according to the second example embodiment.

Next, a flow of a process in which the SNPN-AMF 42 transmits the SNPN identification information to the N3IWF 35, which is different from that in FIG. 4, will be described by using FIG. 9. FIG. 9 is a process executed when a parameter or configuration information held by the SNPN-AMF 42 is updated.

First, the SNPN-AMF 42 transmits a RAN CONFIGURATION UPDATE message to the N3IWF 35 (S31). Similarly to the NG SETUP REQUEST message, the RAN CONFIGURATION UPDATE message includes the global RAN node ID as a parameter. In the step S31, the SNPN-AMF 42 transmits the RAN CONFIGURATION UPDATE message in which the SNPN ID is set in the global RAN node ID to the N3IWF 35.

When receiving the RAN CONFIGURATION UPDATE message in which the SNPN ID is set, the N3IWF 35 transmits a RAN CONFIGURATION UPDATE ACK message to the SNPN-AMF 42 as a response message (S32). When acquiring the SNPN-ID from the SNPN-AMF 42, the N3IWF 35 manages the acquired SNPN-ID and the identification information of the SNPN-AMF 42 in association with each other.

Figure 10:
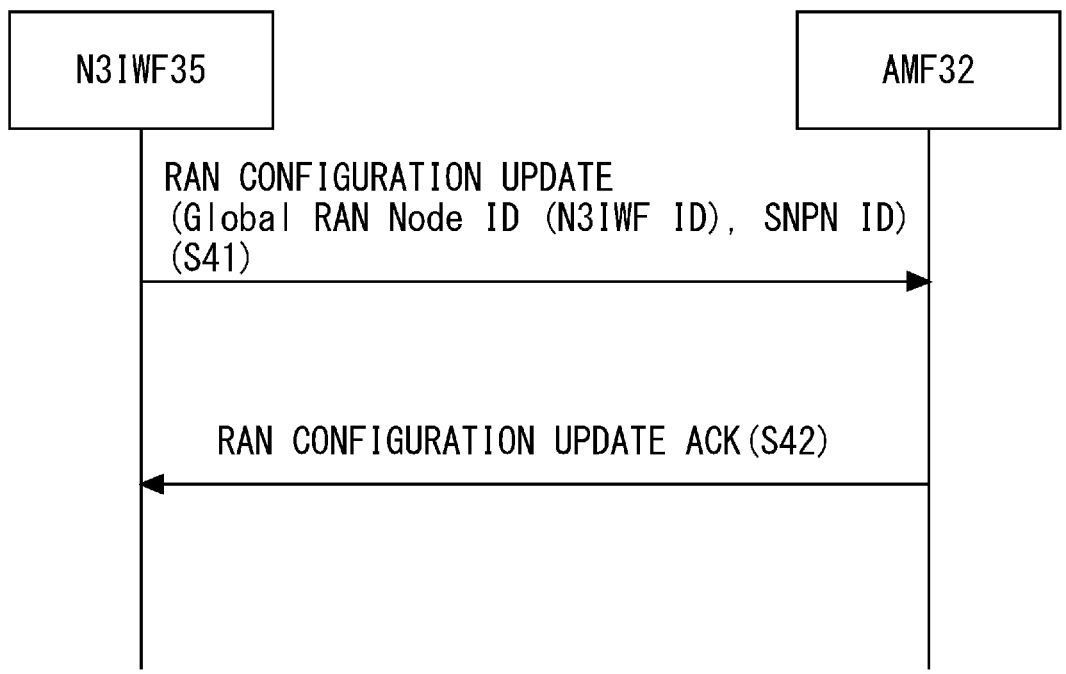
FIG. 10 is a diagram illustrating a flow of a process in which the N3IWF transmits SNPN identification information to the AMF according to the second example embodiment.

Next, a flow of a process in which the N3IWF 35 transmits the SNPN identification information to the AMF 32, which is different from that in FIG. 8, will be described by using FIG. 10. FIG. 10 is a process executed when a parameter or configuration information held by the N3IWF 35 is updated.

First, the N3IWF 35 transmits the RAN CONFIGURATION UPDATE message to the AMF 32 (S41). The RAN CONFIGURATION UPDATE message is set with a similar parameter as that set in the NG SETUP REQUEST message in the step S21 in FIG. 8.

Next, when receiving the RAN CONFIGURATION UPDATE message in which the N3IWF ID and the SNPN ID are set, the AMF 32 transmits the RAN CONFIGURATION UPDATE ACK message to the N3IWF 35 as a response message (S42). When acquiring the N3IWF ID and the SNPN-ID from the N3IWF 35, the AMF 32 manages the N3IWF ID and the SNPN-ID included in the RAN CONFIGURATION UPDATE message in association with each other.

Figure 11:
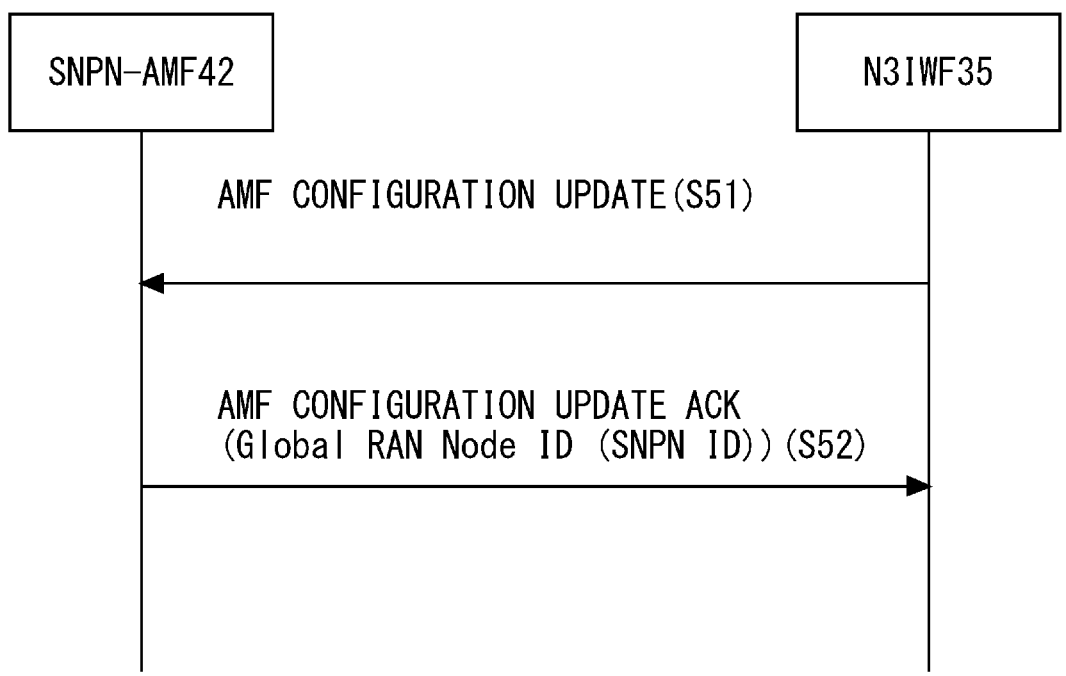
FIG. 11 is a diagram illustrating a flow of a process in which the SNPN-AMF transmits SNPN identification information to the N3IW 5 according to the second example embodiment.

Next, a flow of a process in which the SNPN-AMF 42 transmits the SNPN identification information to the N3IWF 35, which is different from that in FIGS. 4 and 9, will be described by using FIG. 11. FIG. 11 is a process executed when a parameter or configuration information held by the N3IWF 35 is updated. Alternatively, FIG. 11 is a process executed when the N3IWF 35 acquires a parameter or configuration information held in the SNPN-AMF 42.

First, the N3IWF 35 transmits an AMF CONFIGURATION UPDATE message to the SNPN-AMF 42 (S51).

Next, when receiving the AMF CONFIGURATION UPDATE message, the SNPN-AMF 42 transmits an AMF CONFIGURATION UPDATE ACK message to the N3IWF 35 as a response message (S52). Similarly to the NG SETUP REQUEST message, the AMF CONFIGURATION UPDATE ACK message includes the global RAN node ID as a parameter. In the step S52, the SNPN-AMF 42 transmits the AMF CONFIGURATION UPDATE ACK message in which the SNPN ID is set in the global RAN node ID to the N3IWF 35.

When acquiring the SNPN-ID from the SNPN-AMF 42, the N3IWF 35 manages the acquired SNPN-ID and the identification information of the SNPN-AMF 42 in association with each other.

Figure 12:
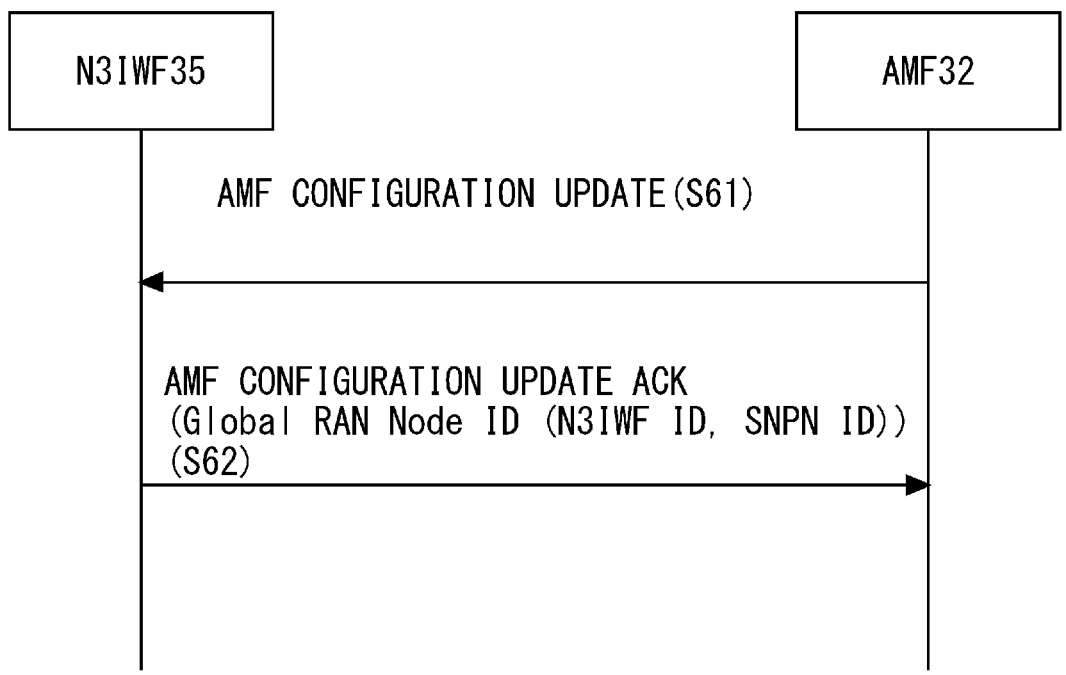
FIG. 12 is a diagram illustrating a flow of a process in which the N3IWF transmits SNPN identification information to the AMF according to the second example embodiment.

Next, a flow of a process in which the N3IWF 35 transmits the SNPN identification information to the AMF 32, which is different from that in FIGS. 8 and 10, will be described by using FIG. 12. FIG. 12 is a process executed when a parameter or configuration information held by the AMF 32 is updated. Alternatively, FIG. 12 is a process executed when the AMF 32 acquires a parameter or configuration information held in the N3IWF 35.

First, the AMF 32 transmits the AMF CONFIGURATION UPDATE message to the N3IWF 35 (S61).

Next, when receiving the AMF CONFIGURATION UPDATE message, the N3IWF 35 transmits the AMF CONFIGURATION UPDATE ACK message to the AMF 32 as a response message (S62). The AMF CONFIGURATION UPDATE ACK message is set with a similar parameter as that set in the NG SETUP REQUEST message in the step S21 in FIG. 8.

When acquiring the N3IWF ID and the SNPN-ID from the N3IWF 35, the AMF 32 manages the N3IWF ID and the SNPN-ID included in the AMF CONFIGURATION UPDATE ACK message in association with each other.

Next, a flow of a distribution process of emergency information according to the second example embodiment will be described by using FIG. 13. First, the SNPN-AMF 42, the N3IWF 35, and the AMF 32 execute the setup process of each node described in FIGS. 4, 8, and 12 (S70). In addition, in the step S70, the SNPN-AMF 42 executes a registration process for registering the UE 43 in the SNPN-AMF 42. In the setup process in the step S70, the N3IWF 35 manages the SNPN ID and the SNPN-AMF 42 being a transmission source of the SNPN ID in association with each other. Further, the AMF 32 manages the SNPN ID and the N3IWF 35 being a transmission source of the SNPN ID in association with each other. In addition, in the setup process of the step S70, the N3IWF 35 establishes an IPsec SA with the UE 43. Further, the UE 43 may be a UE that remains in the SNPN-RAN 41 by receiving a broadcast control channel (BCCH) for broadcast information of the SNPN-RAN 41 without executing a registration process for registering in the SNPN-AMF 42.

Next, the CBE 34 transmits, to the CBCF/PWS-IWF 33, an Emergency Broadcast Request message for requesting distribution of the emergency information (S71). Next, the CBCF/PWS-IWF 33 transmits a NonUeN2Message Transfer message for requesting distribution of the emergency information to the AMF 32 (S72). The NonUeN2Message Transfer message includes a Write-Replace Warning Request NG-RAN message.

FIG. 14 illustrates a list of parameters to be set in the Write-Replace Warning Request NG-RAN message. The Write-Replace Warning Request NG-RAN message sets a warning area list NG-RAN as a parameter in order to specify a distribution area. The CBCF/PWS-IWF 33 sets the SNPN ID in the warning area list NG-RAN in order to distribute the emergency information to the SNPN. The SNPN ID included in the warning area list NG-RAN may be a list of SNPN IDs. A warning area list or the warning area list NG-RAN also specifies an ID for identifying an EA, a TA, or a cell being a distribution area other than the SNPN.

The CBCF/PWS-IWF 33 may have previously acquired the SNPN ID from the AMF 32. Alternatively, the CBCF/PWS-IWF 33 may have acquired the SNPN ID from a system or the like that manages the entire MNO network including the SNPN. Alternatively, an administrator or the like managing the MNO network may input, to the CBCF/PWS-IWF 33, the SNPN ID of a SNPN being added when the SNPN is added to the MNO.

Returning to FIG. 13, the AMF 32 transmits a response message for the NonUeN2Message Transfer message to the CBCF/PWS-IWF 33 (S73). The response message transmitted by the AMF 32 includes a Write-Replace Warning Confirm NG-RAN. When receiving the response message from the AMF 32, the CBCF/PWS-IWF 33 transmits an Emergency Broadcast Response message to the CBE 34 as a response message for the Emergency Broadcast Request message (S74).

Next, the AMF 32 determines a transmission destination of the Write-Replace Warning Request message, based on the SNPN ID acquired in the step S72. For example, when receiving the Write-Replace Warning Request NG-RAN message including the SNPN ID in the step S72, the AMF 32 selects the N3IWF 35 associated with the SNPN ID. In addition, the AMF 32 transmits a Write-Replace Warning Request message to the selected N3IWF 35 (S75). The Write-Replace Warning Request message transmitted to the N3IWF 35 includes the SNPN ID acquired in the step S72.

In addition, the N3IWF 35 transfers the received Write-Replace Warning Request message to the SNPN-AMF 42 associated with the SNPN ID included in the Write-Replace Warning Request message (S75). In other words, the N3IWF 35 selects the SNPN ID included in the Write-Replace Warning Request message from among the plurality of SNPN IDs managed by the N3IWF 35. The N3IWF 35 transfers the received Write-Replace Warning Request message to the SNPN-AMF 42 associated with the selected SNPN ID.

Next, the SNPN-AMF 42 distributes the emergency information to the UE 43 via the SNPN-RAN 41 (S76). The SNPN-RAN 41 receives the Write-Replace Warning Request message from the SNPN-AMF 42 (not illustrated). The SNPN-RAN 41 notifies all UEs receiving the BCCH of the SNPN-RAN 41 of the emergency information by broadcasting, using the BCCH, the emergency information being set in the received Write-Replace Warning Request message.

Further, the IPsec SA is established between the N3IWF 35 and the UE existing under the SNPN-RAN 41. Therefore, the N3IWF 35 may transmit the emergency information to each UE using unicast communication. That is, the N3IWF 35 may transparently transfer the emergency information received from the AMF 32 to the UE.

When the transmission of the emergency information to the UE existing under the SNPN-RAN 41 is completed, the SNPN-AMF 42 transmits the Write-Replace Warning Response message to the N3IWF 35 (S77). The N3IWF 35 transfers the received Write-Replace Warning Response message to the AMF 32 (S77).

Next, the AMF 32 transmits a NonUeN2InfoNotify message to the CBCF/PWS-IWF 33 (S78). The NonUeN2InfoNotify message includes a Write-Replace Warning Indication NG-RAN message. Further, the AMF 32 determines whether the transmission of the emergency information to each UE has succeeded or failed, based on a parameter included in the Write-Replace Warning Response message (S79). In the step S79, the AMF 32 holds a determination result.

In a description of FIG. 13, a case where the AMF 32 receives the Write-Replace Warning Request NG-RAN message including the SNPN ID in the step S72 is described. As another example, AMF 32 may receive a Write-Replace Warning Request NG-RAN that does not include the SNPN ID but includes the N3IWF ID. The N3IWF ID may be a list of N3IWF IDs including a plurality of N3IWF IDs. In this case, in the step S75, the AMF 32 transmits the Write-Replace Warning Request message to the N3IWF 35 specified by the acquired N3IWF ID. In addition, the N3IWF 35 transmits the Write-Replace Warning Request message to all SNPN-AMFs being connected via the Y2 interface. That is, the N3IWF 35 selects all the SNPN IDs being managed, and transmits the Write-Replace Warning Request message to the SNPN-AMF associated with each SNPN ID.

As described above, the N3IWF 35 manages the SNPN ID and the SNPN-AMF 42 in association with each other, and the AMF 32 manages the SNPN ID and the N3IWF 35 in association with each other. Therefore, when the CBCF/PWS-IWF 33 distributes the emergency information specifying the SNPN ID, the AMF 32 can transmit the emergency information to the N3IWF 35 associated with the specified SNPN ID. In addition, the N3IWF 35 may transmit the emergency information to the SNPN-AMF 42 associated with the SNPN ID. As a result, the emergency information distributed from the CBE 34 is distributed to the UE existing in the SNPN.

Further, the AMF 32 may also receive the emergency information in which the SNPN ID is not specified and the N3IWF ID is specified. In this case, the AMF 32 transmits the emergency information to the N3IWF 35 identified by the N3IWF ID, and the N3IWF 35 transmits the emergency information to all SNPN-AMFs being connected via the Y2 interface. As a result, the emergency information distributed from the CBE 34 is distributed to the UE existing in the SNPN.

Third Example Embodiment

Next, information notified from a SNPN-AMF 42 to an N3IWF 35 according to a third example embodiment will be described by using FIG. 15. In the third example embodiment, the SNPN-AMF 42 transmits a SNPN ID and location information to the N3IWF 35. Specifically, the SNPN-AMF 42 transmits the SNPN ID and the location information to the N3IWF 35 in the sequence in FIG. 4, FIG. 9, or FIG. 11.

The location information may be information indicating geographic information. The location information may be, for example, area information indicating a service area of a SNPN identified by the SNPN ID. The area information may be, for example, information indicating the entire service areas of the SNPN, or information indicating a location of some of the service areas of the SNPN. Specifically, the location information may be a global positioning system (GPS) information acquired by the SNPN-AMF 42, or may be location information defined in a request for comments (RFC) 5580.

For example, as illustrated in FIG. 15, the location information may be included as "Location" in parameters constituting the SNPN ID. Specifically, the Location may be associated with an NID, as illustrated in FIG. 15. Alternatively, the location information may be added as "Location" to an IE/Group Name indicating a parameter constituting a global RAN node ID in FIG. 6.

Herein, the N3IWF 35 may associate the location information with a distribution area of emergency information determined in an MNO network in advance. Specifically, the N3IWF 35 may associate the location information with a TA identity (TAI) for identifying a TA. For example, a location indicated by the location information associated with the TAI may be a location within the TA identified by the TAI. Alternatively, a location indicated by the location information associated with the TAI may be a location around the TA.

When acquiring the location information from the SNPN-AMF 42, the N3IWF 35 determines the TAI associated with the location information. When determining the TAI, the N3IWF 35 transmits the determined TAI to an AMF 32. For example, the N3IWF 35 transmits the SNPN ID and the TAI to the AMF 32 in the sequence in FIG. 8, FIG. 10, or FIG. 12. Further, the N3IWF 35 manages the SNPN-AMF 42, the SNPN ID transmitted from the SNPN-AMF 42, and the determined TAI in association with one another.

The TAI may be included as a "TAI" in a parameter constituting the SNPN ID as illustrated in FIG. 16, for example. Specifically, the TAI may be associated with the NID, as illustrated in FIG. 16. Alternatively, the TAI may be added as "TAI" to the IE/Group Name indicating the parameter constituting the global RAN node ID in FIG. 6.

When receiving the SNPN ID and the TAI from the N3IWF 35, the AMF 32 manages the N3IWF 35, the SNPN ID, and the TAI in association with one another.

Next, a flow of a distribution process of emergency information according to the third example embodiment will be described by using FIG. 13. Herein, a difference from the flow of the distribution process of the emergency information in the second example embodiment will be mainly described, and a detailed description of a point common to the flow of the distribution process of the emergency information in the second example embodiment will be omitted.

In the step S72 in FIG. 13, a CBCF/PWS-IWF 33 transmits, to the AMF 32, a Write-Replace Warning Request NG-RAN including a TAI identifying a TA indicating a distribution destination of the emergency information. Thereafter, in the step S75, the AMF 32 transmits a Write-Replace Warning Request message to the N3IWF 35 associated with the TAI. In addition, in the step S75, the N3IWF 35 transfers the Write-Replace Warning Request message to the SNPN-AMF 42 associated with the TAI. In this manner, emergency information distributed from a CBE 34 may be transmitted to the SNPN-AMF 42 deployed in the SNPN.

In the above-described description, an example in which the N3IWF 35 manages the TAI and the SNPN ID in association with each other and the AMF 32 manages the TAI and the N3IWF ID in association with each other has been described, but the information to be managed is not limited to the TAI.

For example, the N3IWF 35 may manage a pseudo TAI indicating the same value or same information as the TAI in association with the SNPN ID. In addition, the AMF 32 may manage the pseudo TAI and the N3IWF ID in association with each other. In the step S72, the AMF 32 receives the Write-Replace Warning Request NG-RAN message including the TAI. In this case, in the step S75, the AMF 32 transmits the Write-Replace Warning Request message to the N3IWF associated with the pseudo TAI indicating the same value or same information as the TAI. The Write-Replace Warning Request message includes the pseudo TAI. In addition, in the step S75, the N3IWF 35 transfers the Write-Replace Warning Request message to the SNPN-AMF 42 associated with the pseudo TAI.

In general, a TAI is used when performing paging a UE. However, a UE 43 existing in the SNPN is registered in the SNPN-AMF 42. In other words, the UE 43 is performed registration in the SNPN-AMF 42. In this case, the UE 43 is not a target of paging in the MNO network. Therefore, the N3IWF 35 may associate the location information of the SNPN with the pseudo TAI being a parameter different from the TAI, not with the TAI used for paging. The pseudo TAI indicates the same value or same information as the TAI, but is not used for paging because it is different from the TAI. Herein, a parameter named Pseudo TAI is described as a parameter used in place of the TAI, but a parameter named Pseudo TAI may be any other name as long as it is a name distinguished from the TAI.

Further, in the above-described description, an example in which the N3IWF 35 associates the location information with the TAI has been described, but for example, the N3IWF 35 may transmit the location information received from the SNPN-AMF 42 to the AMF 32. In this case, the AMF 32 may associate the location information with the TAI.

As described above, in a communication system according to the third example embodiment, the N3IWF 35 manages the TAI and the SNPN ID in association with each other, and the AMF 32 manages the TAI and the N3IWF ID in association with each other. Thus, even when the CBCF/PWS-IWF 33 specifies the distribution area of the emergency information by using the TAI, since the TAI and the SNPN ID are associated with each other, the emergency information is distributed to the SNPN. As a result, the CBCF/PWS-IWF 33 can distribute the emergency information to the UE existing in the SNPN by using the TAI indicating the distribution area of the emergency information in general without specifying the SNPN ID.

Figure 17:
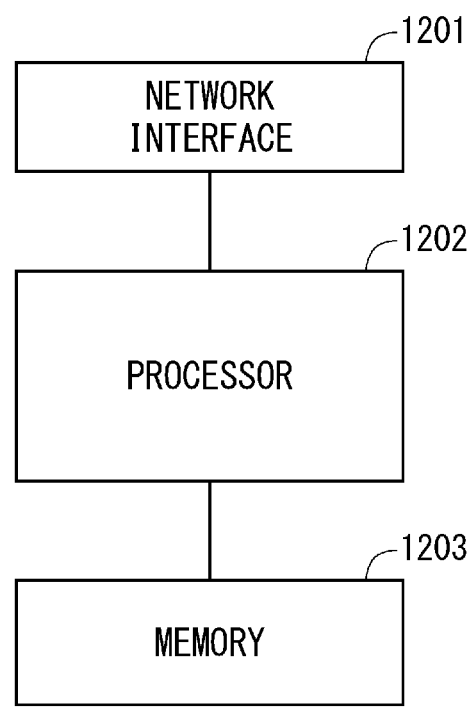
FIG. 17 is a configuration diagram of a gateway device and the like according to each example embodiment.

FIG. 17 is a block diagram illustrating a configuration example of a gateway device 10, a core network device 20, the N3IWF 35, and the AMF 32 (hereinafter, referred to as the gateway device 10 and the like). Referring to FIG. 17, the gateway device 10 and the like include a network interface 1201, a processor 1202, and a memory 1203. The network interface 1201 is used for communicating with a network node (e.g., gNB, AMF, and SMF). The network interface 1201 may include, for example, a network interface card (NIC) compliant with IEEE 802.3 series. Herein, an eNB represents an evolved node B, an MME represents a mobility management entity, and a P-GW represents a packet data network gateway. IEEE represents the institute of electrical and electronics engineers.

The processor 1202 reads software (a computer program) from the memory 1203 and executes the software (computer program), and thereby executes processing of the gateway device 10 and the like described by using the flowcharts in the example embodiments described above. The processor 1202 may be, for example, a microprocessor, an MPU, or a CPU. The processor 1202 may include a plurality of processors.

The memory 1203 is constituted of a combination of a volatile memory and a non-volatile memory. The memory 1203 may include a storage located away from the processor 1202. In this case, the processor 1202 may access the memory 1203 via a not-illustrated input/output (I/O) interface.

In the example in FIG. 17, the memory 1203 is used for storing a software module group. The processor 1202 reads the software module group from the memory 1203 and executes the read software module group, and thereby executes the processing of the gateway device 10 and the like described in the above example embodiments.

As described by using FIG. 17, each of the processors included in the gateway device 10 and the like in the above-described example embodiments executes one or a plurality of programs including an instruction group for causing a computer to execute algorithm described by using the drawings.

In the above-described examples, a program can be stored by using various types of non-transitory computer-readable media, and supplied to a computer. The non-transitory computer-readable medium includes various types of tangible storage media. Examples of the non-transitory computer-readable medium include a magnetic recording medium (e.g., a flexible disk, a magnetic tape, a hard disk drive), a magneto-optical recording medium (e.g., a magneto-optical disk), a CD-read only memory (ROM), a CD-R, a CD-R/W, a semiconductor memory (e.g., a mask ROM, a programmable ROM (PROM), an erasable PROM (EPROM), a flash ROM, a random access memory (RAM)). Further, the program may also be supplied to the computer by various types of transitory computer-readable media. Examples of the transitory computer-readable medium include an electric signal, an optical signal, and an electromagnetic wave. The transitory computer-readable medium may supply the program to the computer via a wired communication path such as an electric wire and an optical fiber, or a wireless communication path.

Although the present disclosure of the present application has been described above with reference to the example embodiments, the present disclosure of the present application is not limited to the above. Various modifications can be made to the configuration and details of the present disclosure of the present application as will be understood by those skilled in the art within the scope of the disclosure.

It should be noted that the present disclosure is not limited to the above-mentioned example embodiments, and can be modified as appropriate within a range not deviating from the gist.

Some or all of the above example embodiments may also be described as the following supplementary notes, but are not limited to the following.

(Supplementary Note 1)

A gateway device comprising:

communication means for receiving a stand-alone non-public network (SNPN) identification information to be used for identifying a SNPN from a SNPN core network device deployed in the SNPN, and transmitting emergency information to the SNPN core network device after receiving a distribution message for requesting for distributing the emergency information via a network operated by a communication carrier; and distribution control means for selecting, when receiving the distribution message, at least one piece of SNPN identification information from among a plurality of pieces of the SNPN identification information received from a plurality of the SNPN core network devices, wherein the communication means is configured to transmit the emergency information to the SNPN core network device deployed in the SNPN identified by the selected SNPN identification information.

(Supplementary Note 2)

The gateway device according to Supplementary note 1, wherein the distribution control means is configured to manage the SNPN core network device and SNPN identification information received from the SNPN core network device in association with each other.

(Supplementary Note 3)

The gateway device according to Supplementary note 1 or 2, wherein the distribution control means is configured to select, when receiving the distribution message including the SNPN identification information, the SNPN identification information included in the distribution message from among a plurality of pieces of the SNPN identification information.

(Supplementary Note 4)

The gateway device according to any one of Supplementary notes 1 to 3, wherein the distribution control means is configured to select, when receiving the distribution message that does not include the SNPN identification information, the entire SNPN identification information received from a plurality of the SNPN core network devices.

(Supplementary Note 5)

The gateway device according to any one of Supplementary notes 1 to 4, wherein the communication means is configured to transmit a list of a plurality of pieces of the SNPN identification information received from a plurality of the SNPN core network devices to a core network device that manages location information of a communication terminal and is deployed in a network managed by a communication carrier.

(Supplementary Note 6)

The gateway device according to any one of Supplementary notes 1 to 5, wherein the communication means is configured to receive SNPN identification information as well as area information indicating a service area of the SNPN identified by the SNPN identification information, and the distribution control means is configured to manage a distribution area of the emergency information in association with the area information, and, when receiving the distribution message including the distribution area, selects the SNPN identification information received together with the area information associated with the distribution area included in the distribution message.

(Supplementary Note 7)

The gateway device according to any one of Supplementary notes 1 to 6, wherein the communication means is configured to receive the SNPN identification information from the SNPN core network device when the SNPN core network device is installed in the SNPN or when configuration information is updated in the SNPN core network device.

(Supplementary Note 8)

A core network device comprising:

communication means for receiving stand-alone non-public network (SNPN) identification information to be used for identifying a SNPN from a SNPN core network device deployed in the SNPN via a gateway device deployed in a network operated by a communication carrier, and transmits a distribution message, which requests for distributing emergency information from an information transmission source via a network operated by a communication carrier, to the gateway device after receiving the distribution message including the SNPN identification information; and distribution control means for selecting, when receiving the distribution message, the gateway device being a transmission source of the SNPN identification information included in the distribution message, wherein the communication means is configured to transmit the distribution message to the selected gateway device.

(Supplementary Note 9)

The core network device according to Supplementary note 8, wherein the distribution control means is configured to manage the gateway device and SNPN identification information received from the gateway device in association with each other.

(Supplementary Note 10)

A communication system comprising:

a gateway device configured to receive stand-alone non-public network (SNPN) identification information to be used for identifying a SNPN from a SNPN core network device deployed in the SNPN and further transmit the SNPN identification information to a core network device, and configured to select at least one piece of SNPN identification information from among a plurality of pieces of the SNPN identification information received from a plurality of the SNPN core network devices, when receiving a distribution message for requesting for distributing emergency information via a network operated by a communication carrier, and further transmit the emergency information to the SNPN core network device deployed in the SNPN identified by the selected SNPN identification information; and a core network device configured to receive, via the gateway device, SNPN identification information to be used for identifying the SNPN, and configured to select the gateway device being a transmission source of the SNPN identification information included in a distribution message, when receiving the distribution message for requesting for distributing emergency information from an information transmission source via a network operated by a communication carrier, and further transmit the distribution message to the selected gateway device.

(Supplementary Note 11)

The communication system according to Supplementary note 10, wherein the gateway device manages the SNPN core network device and SNPN identification information received from the SNPN core network device in association with each other, and the core network device manages the gateway device and SNPN identification information received from the gateway device in association with each other.

(Supplementary Note 12)

A distribution method comprising:

receiving SNPN identification information to be used for identifying a SNPN from a SNPN core network device deployed in the SNPN;

selecting, when receiving a distribution message for requesting for distributing emergency information, at least one piece of SNPN identification information from among a plurality of pieces of the SNPN identification information received from a plurality of the SNPN core network devices; and transmitting the emergency information to the SNPN core network device deployed in the SNPN identified by the selected SNPN identification information.

(Supplementary Note 13)

A distribution method comprising:

receiving stand-alone non-public network (SNPN) identification information to be used for identifying a SNPN from a SNPN core network device deployed in the SNPN via a gateway device deployed in a network operated by a communication carrier;

receiving a distribution message that requests for distributing emergency information from an information transmission source via a network operated by a communication carrier and includes the SNPN identification information;

selecting the gateway device being a transmission source of the SNPN identification information included in the distribution message; and transmitting the distribution message to the selected gateway device.

(Supplementary Note 14)

A non-transitory computer-readable medium storing a program causing a computer to execute:

receiving SNPN identification information to be used for identifying a SNPN from a SNPN core network device deployed in the SNPN;

selecting, when receiving a distribution message for requesting for distributing emergency information, at least one piece of SNPN identification information from among a plurality of pieces of the SNPN identification information received from a plurality of the SNPN core network devices; and transmitting the emergency information to the SNPN core network device deployed in the SNPN identified by the selected SNPN identification information.

(Supplementary Note 15)

A non-transitory computer-readable medium storing a program causing a computer to execute:

receiving stand-alone non-public network (SNPN) identification information to be used for identifying a SNPN from a SNPN core network device deployed in the SNPN via a gateway device deployed in a network operated by a communication carrier;

receiving a distribution message that requests for distributing emergency information from an information transmission source via a network operated by a communication carrier and includes the SNPN identification information;

selecting the gateway device being a transmission source of the SNPN identification information included in the distribution message; and transmitting the distribution message to the selected gateway device.

This application is based upon and claims the benefit of priority from Japanese Patent Application No. 2020-052919, filed on Mar. 24, 2020, the entire contents of which are incorporated herein.

REFERENCE SIGNS LIST

10 Gateway device
11 Communication unit
12 Distribution control unit
20 Core network device
21 Communication unit 22 Distribution control unit
30 MNO network
31 RAN
32 AMF
33 CBCF/PWS-IWF
34 CBE
35 N3IWF
36 UE
40 SNPN
41 SNPN-RAN
42 SNPN-AMF
43 UE

What is claimed is:

1. A first node for access and mobility management, in a Public Land Mobile Network (PLMN), the first node comprising:
   at least one processor; and
   at least one memory coupled to the at least one processor, the at least one memory storing instructions that if executed by the at least one processor, cause the at least one processor to:
      receive, from a second node, information identifying a Stand-Alone Non-Public Network (SNPN), the second node communicatively coupled with the first node via an N2 reference point; and
      send, to the second node, a warning message comprising warning message information to be broadcast to a User Equipment (UE) that accesses the SNPN.

2. A first node communicatively coupled with a second node via an N2 reference point, the second node configured for access and mobility management in a Public Land Mobile Network (PLMN), the first node comprising:
   at least one processor; and
   at least one memory coupled to the at least one processor, the at least one memory storing instructions that if executed by the at least one processor, cause the at least one processor to:
      send, to the second node, information identifying a Stand-Alone Non-Public Network (SNPN); and
      receive, from the second node, a warning message comprising warning message information to be broadcast to a User Equipment (UE) that accesses the SNPN.

3. A method of a first node for access and mobility management, in a Public Land Mobile Network (PLMN), the method comprising:
   receiving, from a second node, information identifying a Stand-Alone Non-Public Network (SNPN), the second node communicatively coupled with the first node via an N2 reference point; and
   sending, to the second node, a warning message comprising warning message information to be broadcast to a User Equipment (UE) that accesses the SNPN.

4. A method of a first node communicatively coupled with a second node via an N2 reference point, the second node configured for access and mobility management in a Public Land Mobile Network (PLMN), the method comprising:
   sending, to the second node, information identifying a Stand-Alone Non-Public Network (SNPN); and
   receiving, from the second node, a warning message comprising warning message information to be broadcast to a User Equipment (UE) that accesses the SNPN.

5. A User Equipment (UE), the UE comprising:
   at least one processor; and
   at least one memory coupled to the at least one processor, the at least one memory storing instructions that if executed by the at least one processor, cause the at least one processor to:
      access a Stand-Alone Non-Public Network (SNPN); and
      receive a warning message comprising warning message information that is broadcast, the warning message being received, from a first node, by a second node that sends, to the first node, information identifying the SNPN, wherein the first node is configured for access and mobility management in a Public Land Mobile Network (PLMN), and the second node is communicatively coupled with the first node via an N2 reference point.

6. A method of a User Equipment (UE), the method comprising:
   accessing a Stand-Alone Non-Public Network (SNPN); and
   receiving a warning message comprising warning message information that is broadcast, the warning message being received, from a first node, by a second node that sends, to the first node, information identifying the SNPN, wherein the first node is configured for access and mobility management in a Public Land Mobile Network (PLMN), and the second node is communicatively coupled with the first node via an N2 reference point.

* * * * *